United States Patent [19]
Fukushige

[11] Patent Number: 5,498,981
[45] Date of Patent: Mar. 12, 1996

[54] READY SIGNAL CONTROL APPARATUS CAPABLE OF AUTOMATICALLY DEACTIVATING READY SIGNAL

[75] Inventor: Minoru Fukushige, Tokyo, Japan

[73] Assignee: NEC Corporation, Tokyo, Japan

[21] Appl. No.: 381,327

[22] Filed: Jan. 31, 1995

[51] Int. Cl.⁶ .................................................. H03K 19/02
[52] U.S. Cl. .............................. 326/93; 395/550; 395/856
[58] Field of Search .............................. 326/93; 395/275, 395/550, 325

[56] References Cited

U.S. PATENT DOCUMENTS

| | | | |
|---|---|---|---|
| 4,809,217 | 2/1989 | Floro et al. ........................ | 395/275 |
| 4,954,983 | 9/1990 | Klingman .......................... | 395/275 |
| 5,032,982 | 7/1991 | Dalrymple ......................... | 395/550 |
| 5,175,820 | 12/1992 | Gephardt .......................... | 395/275 |
| 5,325,521 | 6/1994 | Koyama et al. ................... | 395/500 |
| 5,388,216 | 2/1995 | Oh .................................... | 395/550 |

*Primary Examiner*—Edward P. Westin
*Assistant Examiner*—Andrew Sanders
*Attorney, Agent, or Firm*—Foley & Lardner

[57] ABSTRACT

In a ready signal control apparatus, connected between a CPU and a plurality of peripheral circuits, a ready signal generated from one of the peripheral circuits is transmitted to the CPU for only a certain definite time period after a selection signal is generated from the CPU.

3 Claims, 7 Drawing Sheets

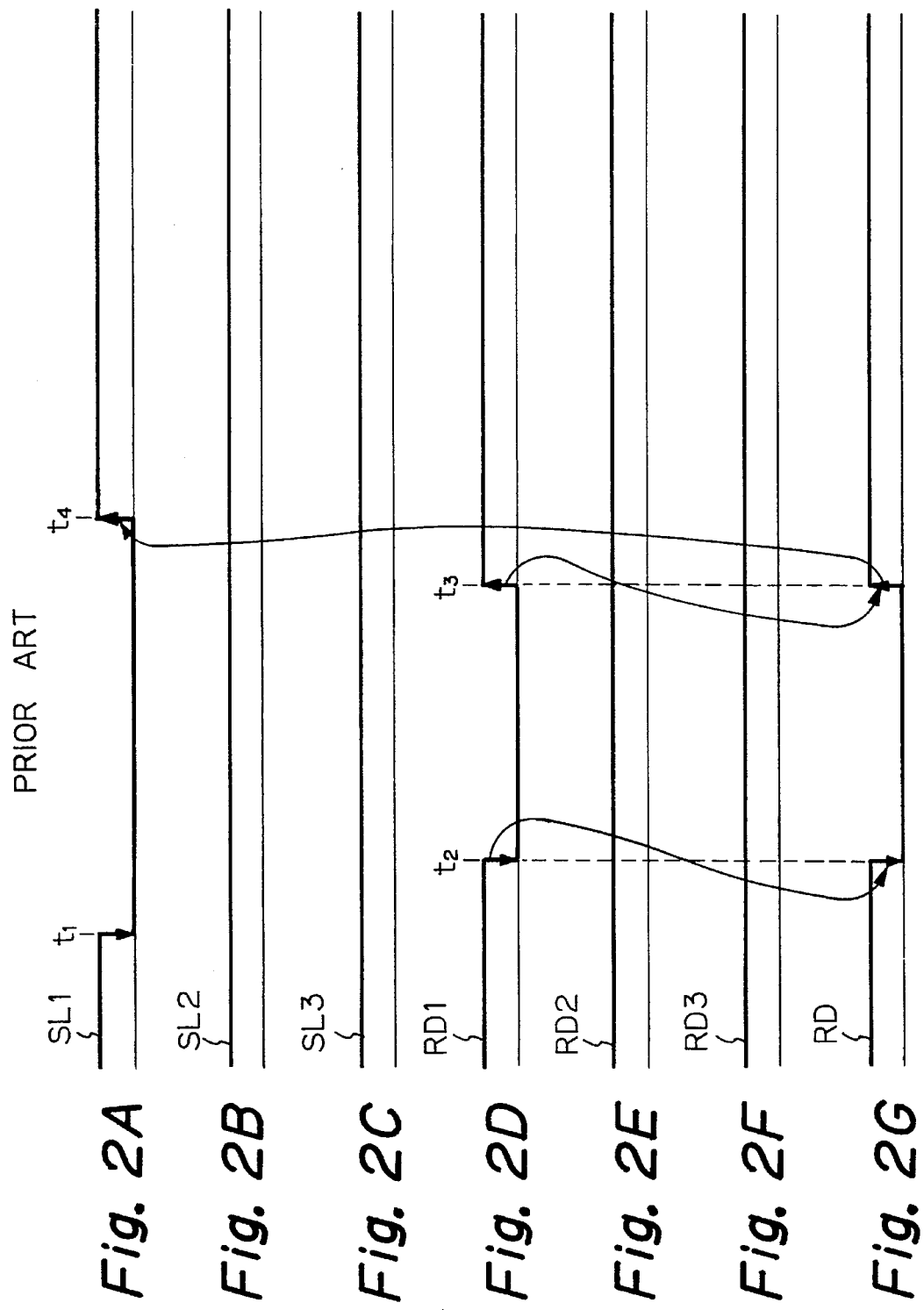

PRIOR ART

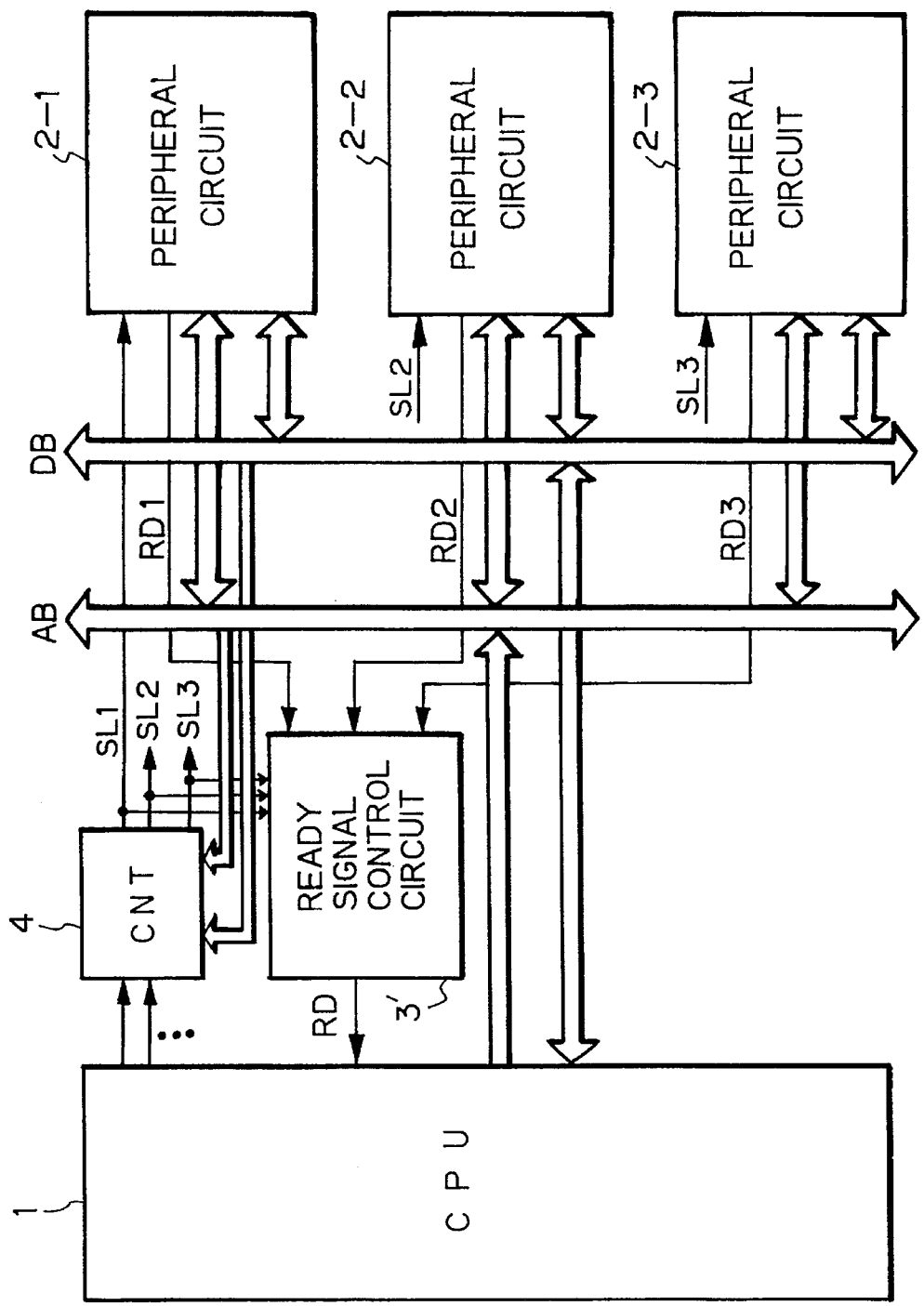

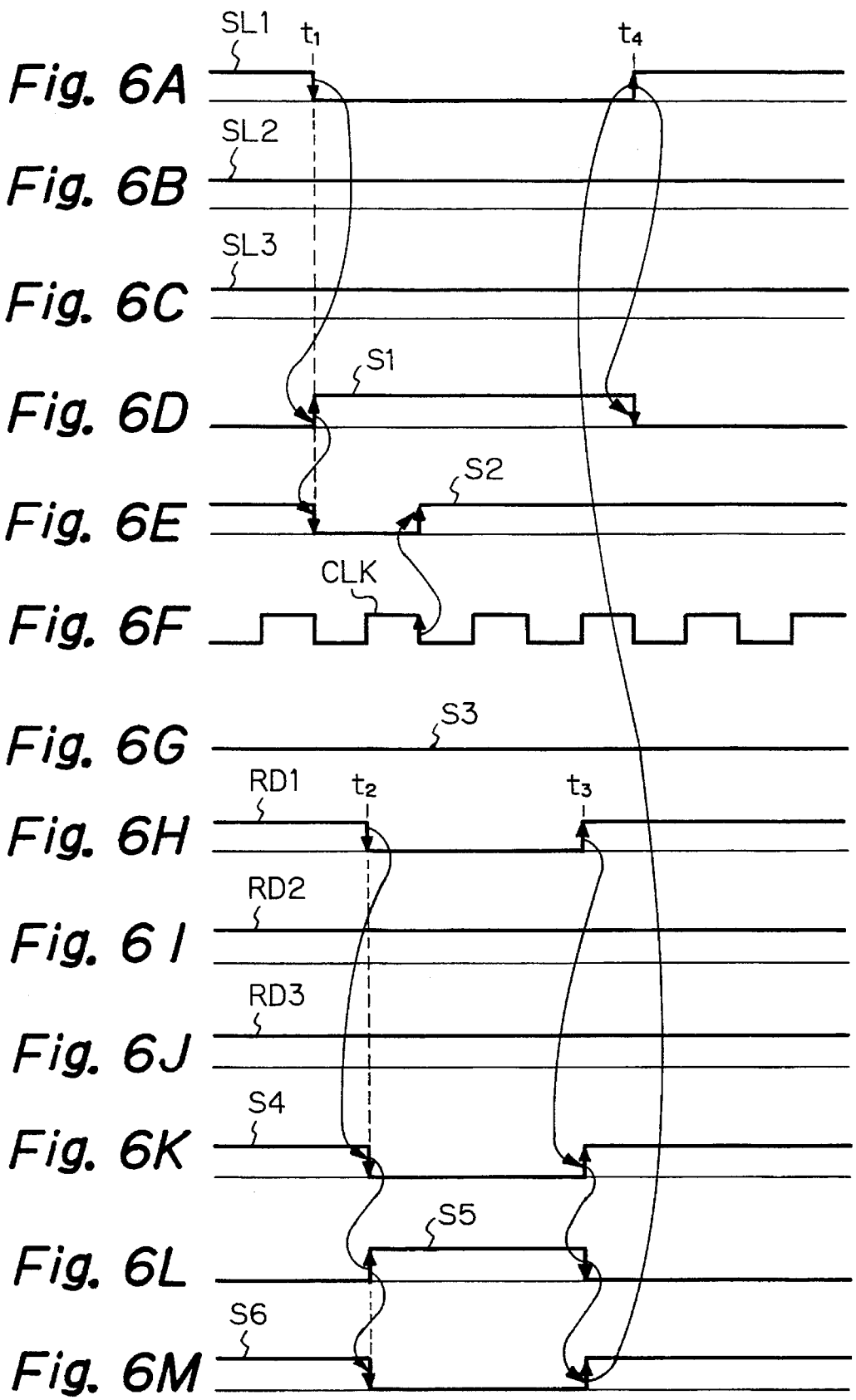

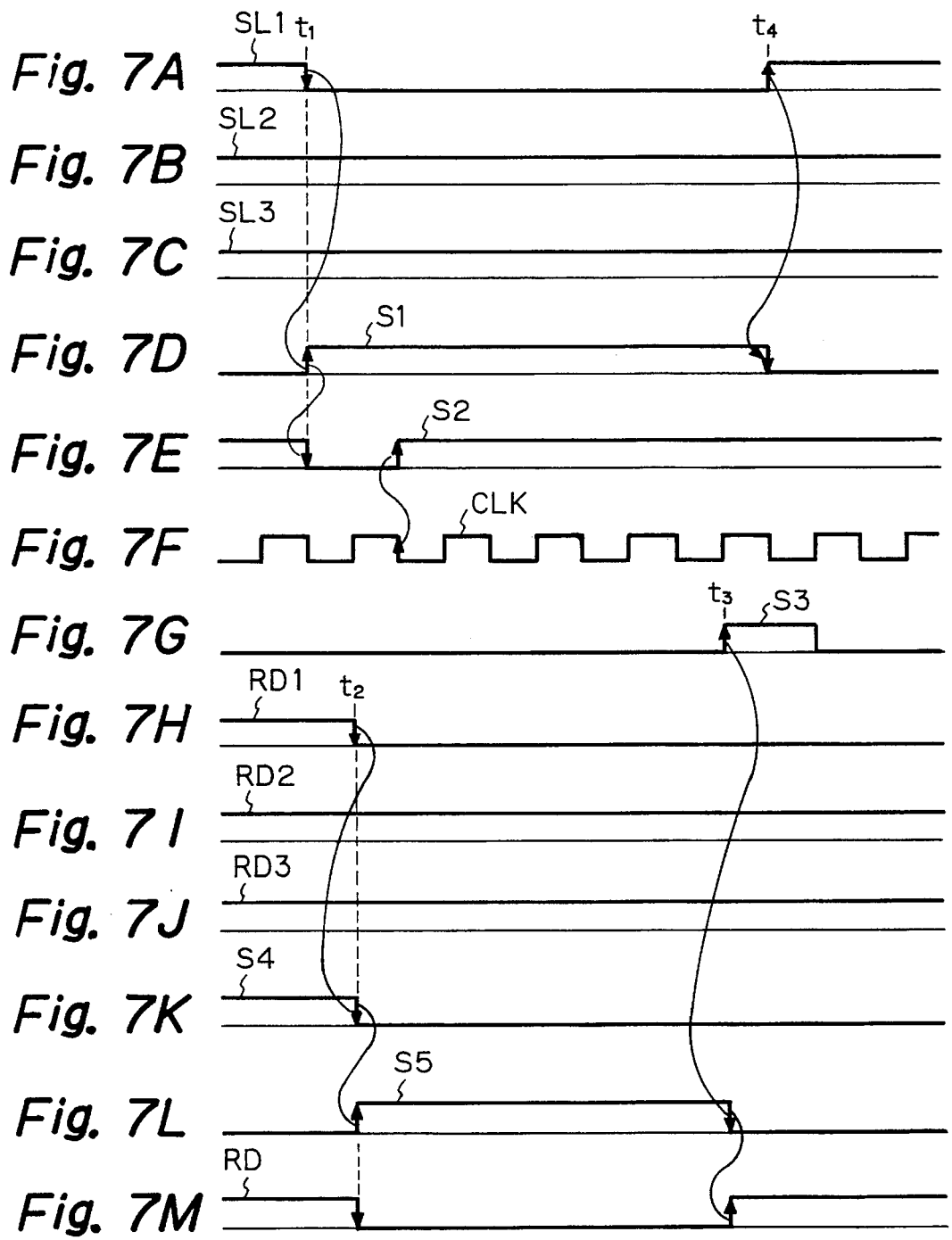

READY SIGNAL CONTROL APPARATUS CAPABLE OF AUTOMATICALLY DEACTIVATING READY SIGNAL

BACKGROUND OF THE INVENTION

1. Field of the Invention

The present invention relates to a ready signal control apparatus connected between a central processing unit (CPU) and a plurality of peripheral circuits which require a wait state of the CPU.

2. Description of the Related Art

Generally, in a computer system, there are two kinds of peripheral circuits: a first type which can operate at a high speed to require no wait state of a CPU, and a second type which can operate at a low speed to require a wait state of the CPU.

In a prior art computer system having a CPU and peripheral circuits of the second type, when the CPU accesses one of the peripheral circuits, the CPU enables a control circuit to generate a selection signal and transmit it to the corresponding peripheral circuit. In response to the selection signal, the corresponding peripheral circuit generates a ready signal which is also called an acknowledgement signal and transmits it to the CPU. As a result, the CPU enters a wait state to access the corresponding peripheral circuit.

In the above-mentioned prior art computer system, however, when the corresponding peripheral circuit is in a fault state for some reason, so that the ready signal never becomes inactive, the CPU continues to be in a wait state for the corresponding peripheral circuit. That is, the CPU substantially becomes in a halt state, and therefore, the CPU cannot access the other peripheral circuits. This will be explained later in detail.

SUMMARY OF THE INVENTION

It is an object of the present invention to provide a ready signal control apparatus connected between a CPU and a plurality of peripheral circuits which require a wait state of the CPU, which apparatus can automatically deactivate a ready signal.

According to the present invention, in a ready signal control apparatus, connected between a CPU and a plurality of peripheral circuits which require a wait state of the CPU, a ready signal generated from one of the peripheral circuits is transmitted to the CPU for only a certain definite time period after a selection signal is generated. Thus, when the certain definite time period has passed, the ready signal is substantially deactivated. As a result, the CPU can complete a normal operation to deactivate the corresponding selection signal, thus accessing then other peripherial circuits.

BRIEF DESCRIPTION OF THE DRAWINGS

The present invention will be more clearly understood from the description as set forth below, as compared with the prior art, with reference to the accompanying drawings, wherein:

FIGS. 2A through 2G and FIGS. 3A through 3G are timing diagrams showing the operation of the computer system of FIG. 1;

FIG. 4 is a block circuit diagram illustrating a computer system including an embodiment of the ready signal control apparatus according to the present invention;

FIGS. 6A through 6M and FIGS. 7A through 7M are timing diagrams showing the operation of the apparatus of FIG. 5.

DESCRIPTION OF THE PREFERRED EMBODIMENT

Before the description of the preferred embodiment, a prior art computer system will be explained with reference to FIGS. 1, 2A through 2G, and 3A through 3G.

Figure 1:
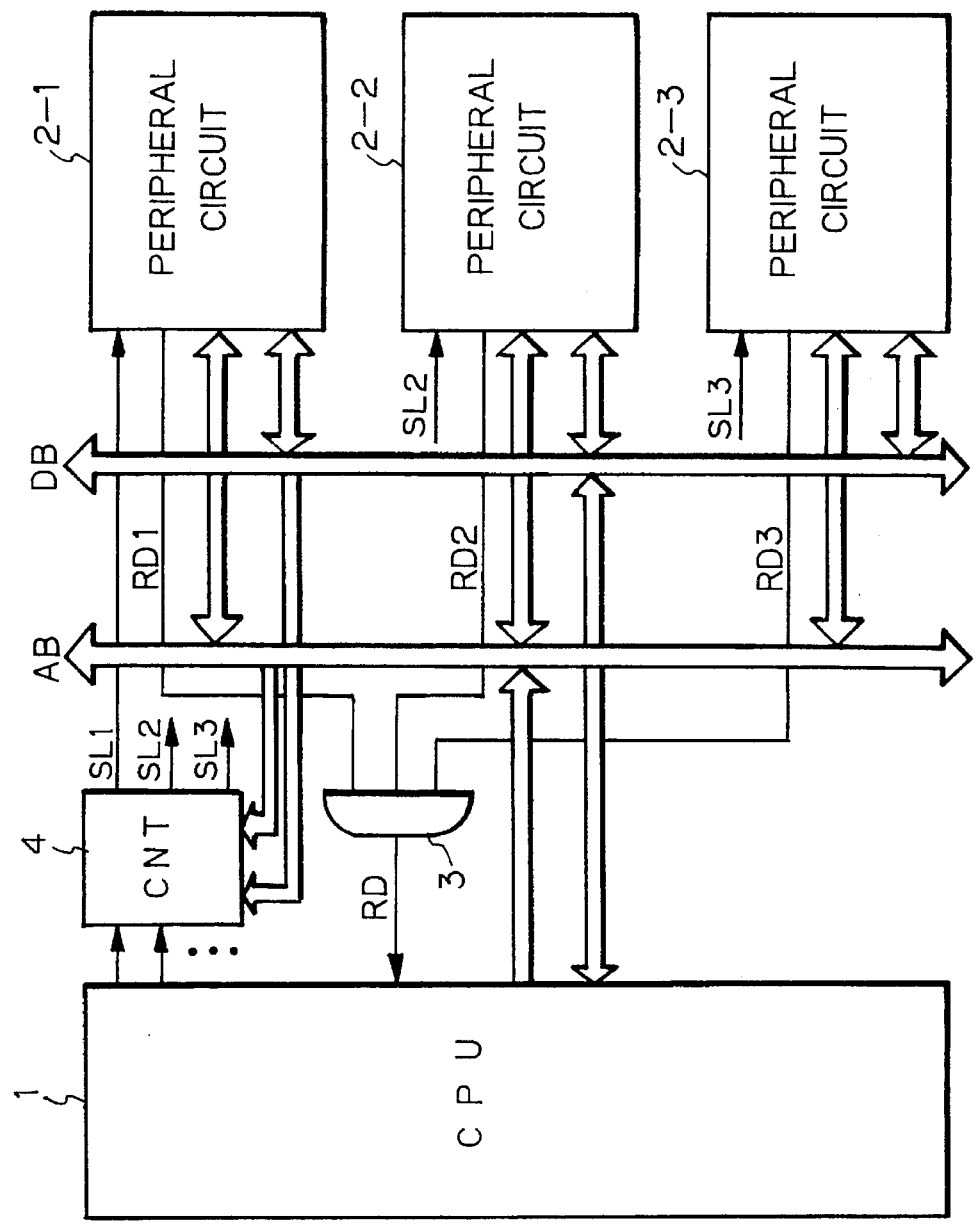
FIG. 1 is a block circuit diagram illustrating a prior art computer system.

In FIG. 1, which illustrates a prior art computer system, reference numeral 1 designates a CPU, and 2-1, 2-2 and 2-3 designate peripheral circuits such memory devices. In this case, the peripheral circuits 2-1, 2-2 and 2-3 can operate at a lower speed than the CPU 1, and therefore, the operation of the peripheral circuits 2-1, 2-2 and 2-3 require a wait state of the CPU 1. The CPU 1 is connected via an address bus AB and a data bus DB to the peripheral circuits 2-1, 2-2 and 2-3. Also, provided between the CPU 1 and the peripheral circuits 2-1, 2-2 and 2-3 are control lines for transmission of selection signals SL1, SL2 and SL3 and ready signals RD1, RD2 and RD3. In this case, the ready signals RD1, RD2 and RD3 are supplied via an AND circuit 3 to the CPU 1. Further, a control circuit 4 receives various signals such as a read/write signal, a selection control signal for the peripheral circuits 2-1, 2-2 and 2-3, and the like from the CPU 1. Also, the address bus AB and the data bus DB are connected to the control circuit 4. For example, the control circuit 4 decodes the selection control signal to generate the selection signals SL1, SL2 and SL3.

An example of normal operation of the computer system of FIG. 1 is explained below with reference to to FIGS. 2A through 2G.

As shown in FIG. 2A, at time $t_1$, when the CPU 1 makes the selection signal SL1 active (SL1=low) via the control circuit 4 as shown in FIG. 2D, at time $t_2$, the peripheral circuit 2-1 activates a ready signal RD1 (=low), so that the output signal RD of the AND circuit 3 is switched from high to low as shown in FIG. 2G. As a result, the CPU 1 enters a wait state to access the peripheral circuit 2-1 via the address bus AD and the data bus DB. Then, as shown in FIG. 2D, at time $t_3$, the peripheral circuit 2-1 deactivates the ready signal RD1 to complete the access operation, so that the output signal RD of the AND circuit 3 is switched from low to high as shown in FIG. 2G. As a result, the CPU 1 completes a normal operation for the peripheral circuit 2-1, to deactivate the selection signal SL1 (SL1=high).

An example of abnormal operation of the computer system of FIG. 1 is explained below with reference to to FIGS. 3A through 3G.

Figure 3A:
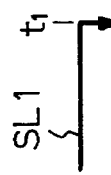
Figure 3B:
Figure 3C:
Figure 3D:
Figure 3E:
Figure 3F:
Figure 3G:

In the same way as in FIGS. 2A through 2G, as shown in FIG. 3A, at time $t_1$, when the CPU 1 makes the selection signal SL1 active (SL1=low) via the control circuit 4 as shown in FIG. 3D, at time $t_2$, the peripheral circuit 2-1 activates a ready signal RD1 (=low), so that the output signal RD of the AND circuit 3 is switched from high to low as shown in FIG, 3G, As a result, the CPU 1 enters a wait state to access the peripheral circuit 2-1 via the address bus AD and the data bus DB. However, after that, it is assumed in this example that the peripheral circuit 2-1 does not deactivate the ready signal RD1 for some reason. In this case, the output signal RD of the AND circuit 3 remains low as shown in FIG. 3G, and therefore, the CPU 1 continues to be in a wait state for the peripheral circuit 2-1, and therefore, the CPU 1 substantially in a halt state. As a result, the CPU 1 cannot access the other peripheral circuits 2-2 and 2-3.

In FIG. 4, which illustrates an embodiment of the present invention, a ready signal control apparatus 3' is provided to include the AND circuit 3 of FIG. 1. The ready signal control apparatus 3' receives the selection signals SL1, SL2 and SL3 from the control circuit 4 in addition to the ready signals RD1, RD2 and RD3 from the peripheral circuits 2-1, 2-2 and 2-3 to generate a ready signal RD.

Figure 5:
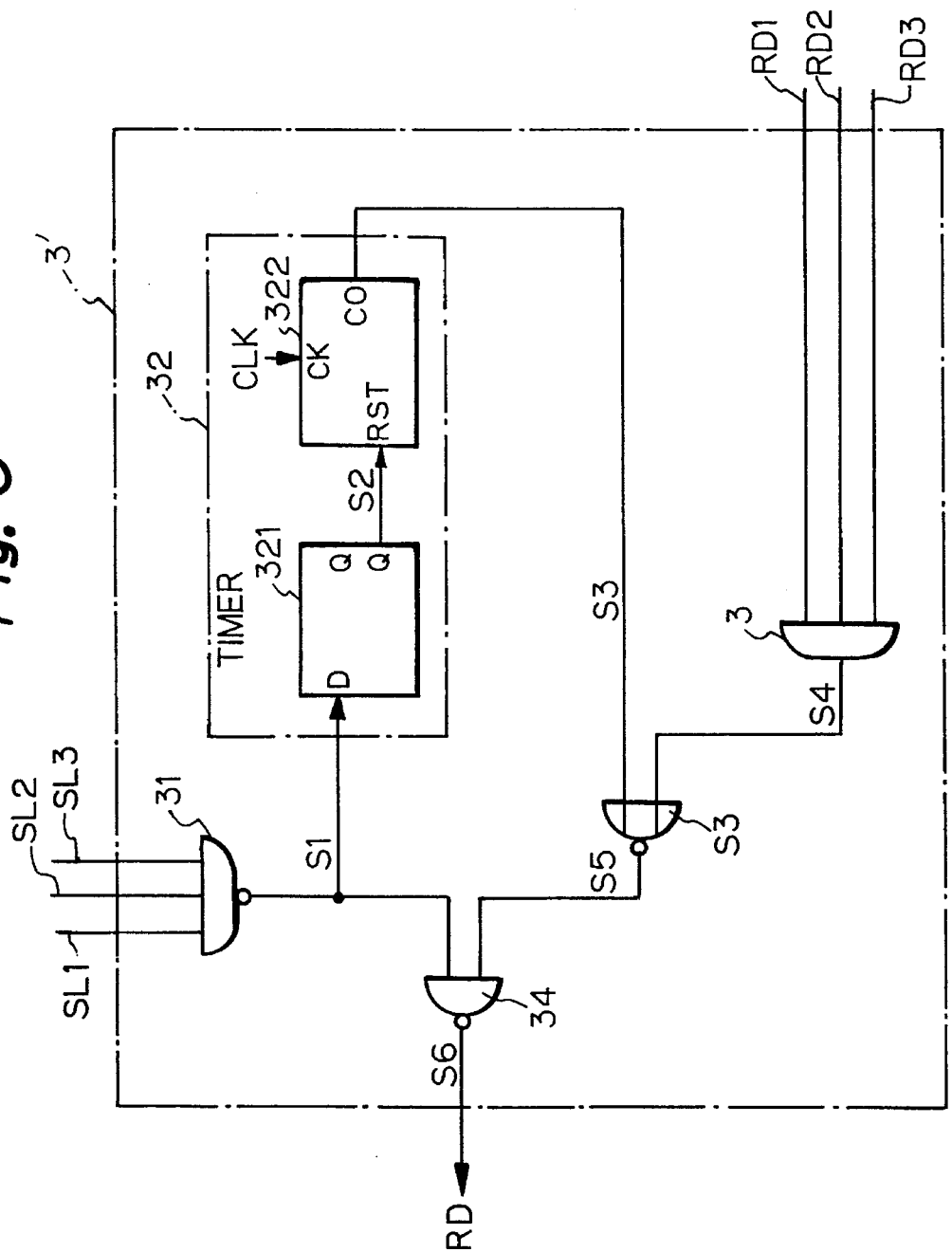
FIG. 5 is a detailed circuit diagram of the ready signal control apparatus of FIG. 4.

In FIG. 5, which is a detailed circuit diagram of the ready signal control apparatus of FIG. 4, a NAND circuit 31 serves as a detecting circuit for detecting at least one of the selection signals SL1, SL2 and SL3 transmitted from the control circuit 4 to the peripheral circuits 2-1, 2-2 and 2-3. That is, when one of the selection signals SL1, SL2 and SL3 is active (low), an output signal S1 of the NAND circuit 31 is high, thus detecting such an active selection signal.

Reference numeral 32 designates a timer formed by a monostable multivibrator 321 and a counter circuit 322. The monostable multivibrator 321 is triggered by a rising edge of the output signal S1 of the NAND circuit 31 to generate a low level pulse signal S2. The counter circuit 322 is reset by the low level pulse signal S2 and counts a clock signal CLK. When the content of the counter circuit 322 exceeds a maximum value such as FFFF (hexadecimal), the counter circuit 322 generates a carry signal CO.

The AND circuit 3 serves as a detecting circuit for detecting at least one of the ready signals RD1, RD2 and RD3 transmitted from the peripheral circuits 2-1, 2-2 and 2-3 to the CPU 1. That is, when one of the ready signals RD1, RD2 and RD3 is active (low), an output signal S4 of the AND circuit 3 is low, thus detecting such an active ready signal.

The output signal S3 of the timer 32 and the output signal S4 of the AND circuit 3 are supplied to a NOR circuit 33. The NOR circuit 33 is control led by the output signal S3 of the timer 32 to pass the signal S4 of the AND circuit 3. That is, when the output signal S3 of the timer 32 is low, an output signal S5 of the NOR circuit 33 is an inverted signal of the output signal S4 of the AND circuit 3. Conversely, when the output signal S3 of the timer 32 is high, the output signal S5 of the NOR circuit 33 is low regardless of the output signal S4 of the AND circuit 3.

The output signal S1 of the NAND circuit 31 and the output signal S5 of the NOR circuit 33 are supplied to a NAND circuit 34. The NAND circuit 34 is controlled by the output signal S1 of the NAND circuit 31 to pass the signal S5 of the NOR circuit 33. That is, when the output signal S1 of the NAND circuit 31 is high, an output signal S6 of the NAND circuit 34 is an inverted signal of the output signal S5 of the NOR circuit 33, Conversely, when the output signal S1 of the NAND circuit 31 is low, the output signal S6 of the NAND circuit 34 is high regardless of the output signal S5 of the NOR circuit 33.

An example of normal operation of the computer system of FIG. 4 including the ready signal control apparatus of FIG. 5 is explained below with reference to FIGS. 6A through 6M.

As shown in FIG. 6A, at time $t_1$, when the CPU 1 makes the selection signal SL1 active (SL1=low) via the control circuit 4, the output signal S1 of the NAND circuit 31 is switched from low to high as shown in FIG. 6D. Simultaneously, as shown in FIG. 6E, the output signal S2 of the monostable multivibrator 321 is switched from high to low to trigger (reset) the counter circuit 322. As a result, the counter circuit 322 begins to count the clock signal CLK as shown in FIG. 6F.

Then, as shown in FIG. 6H, at time $t_2$, the peripheral circuit 2-1 activates the ready signal RD1 (=low). As a result, as shown in FIG. 6K, the output signal S4 of the AND circuit 3 is switched from high to low. Simultaneously, since the output signal S3 of the timer 32 is low as shown in FIG. 6G, the output signal S5 of the NOR circuit 33 is switched from high to low as shown in FIG. 6L. Also, since the output signal S1 of the NAND circuit 31 is high, the output signal S6 of the NAND circuit 34 is switched from low to high as shown in FIG. 6M.

After the CPU 1 accesses the peripheral circuit 2-1 via the address bus AB and the data bus DB, at time $t_3$, the peripheral circuit 2-1 deactivates the ready signal RD1 to complete the access operation as shown in FIG. 6H. As a result, as shown in FIG. 6K, the output signal S4 of the AND circuit 3 is switched from low to high, and accordingly, as shown in FIG. 6L, the output signal S5 of the NOR circuit 33 is switched from high to low. Then, as shown in FIG. 6M, the output signal S6 of the NAND circuit 34 is switched from low to high.

In response to the change in the output signal S6 of the NAND circuit 34 from low to high, at time $t_4$, the CPU 1 deactivates the selection signal SL1 via the control circuit 4 as shown in FIG. 6A, and as a result, the output signal S1 of the NAND circuit 31 is switched from high to low as shown in FIG. 6E.

Thus, the CPU 1 becomes in a state in which it is able to access the other peripheral circuits 2-2 and 2-3.

An example of abnormal operation of the computer system of FIG. 4. including the ready signal control apparatus of FIG. 5 is explained below with reference to FIGS. 7A through 7M.

As shown in FIG. 7A, at time $t_1$, when the CPU 1 makes the selection signal SL1 active (SL1=low) via the control circuit 4, the output signal S1 of the NAND circuit 31 is switched from low to high as shown in FIG. 7D. Simultaneously, as shown in FIG. 7E, the output signal S2 of the monostable multivibrator 321 is switched from high to low to trigger (reset) the counter circuit 322. As a result, the counter circuit 322 begins to count the clock signal CLK as shown in FIG. 7F.

Then, as shown in FIG. 7H, at time $t_2$, the peripheral circuit 2-1 activates the ready signal RD1 (=low). As a result, as shown in FIG. 7K, the output signal S4 of the AND circuit 3 is switched from high to low. Simultaneously, since the output signal S3 of the timer 32 is low as shown in FIG. 7G, the output signal S5 of the NOR circuit 33 is switched from high to low as shown in FIG. 7L. Also, since the output signal S1 of the NAND circuit 31 is high, the outpost signal S6 of the NAND circuit 34 is switched from low to high as shown in FIG. 7M.

Even after the CPU 1 accesses the peripheral circuit 2-1 via the address bus AB and the data bus DB, assume in this example that the peripheral circuit 2-1 cannot deactivate the ready signal RD1 for some reason as shown in FIG. 7H. In this case, as shown in FIG. 7G, at time $t_3$, the output signal S3 of the timer 32 is changed from low to high to disable the NOR circuit 33. As a result, as shown in FIG. 7L, the output signal S5 of the NOR circuit 33 is switched from high to low, and accordingly, as shown in FIG. 7M, the output signal S6 of the NAND circuit 34 is switched from low to high.

In response to the change in the output signal S6 of the NAND circuit 34 from low to high, at time $t_4$, the CPU 1 deactivates the selection signal SL1 via the control circuit 4 as shown in FIG. 7A, and as a result, the output signal S1 of the NAND circuit 31 is switched from high to low as shown in FIG. 7E.

Thus, even in an abnormal state, the CPU 1 becomes in a state in which it is able to access the other peripheral circuits 2-2 and 2-3.

As explained hereinbefore, according to the present invention, when a ready signal cannot be deactivated for some reason, such a ready signal is forcibly made inactive, so that a substantial halt operation of the operation of a CPU can be avoided.

I claim:

1. A ready signal control apparatus, connected between a CPU and a plurality of peripheral circuits whose operation requires a wait state of said CPU, for receiving a ready signal from one of said peripheral circuits and transmitting said ready signal to said CPU, comprising:

first detecting means for detecting whether or not a selection signal is generated and transmitted to one of said peripheral circuits;

counting mans for counting a certain time period after said selection signal is detected;

second detecting means for detecting whether or not one of said peripheral circuits generates a ready signal; and transmitting means for transmitting said ready signal from a timing when said selection signal is generated to a timing when said certain time period has passed, wherein said transmitting means includes a first gate, controlled by said counting means, for passing said ready signal therethrough when said certain time period has not passed yet, and a second gate, connected to an output of said first gate and controlled by said first detecting means, for passing an output signal of said first gate when said selection signal is generated.

2. A ready signal control apparatus, connected between a CPU 1 and a plurality of peripheral circuits, for receiving a ready signal from one of said peripheral circuits and transmitting said ready signal to said CPU, comprising:

a first NAND circuit, for detecting a selection signal for one of said peripheral circuits;

a timer circuit, connected to said first NAND circuit, for counting a certain time period to generate a high signal after an output, signal of said first NAND circuit is changed from low to high;

an AND circuit, connected to said peripheral circuits, for detecting said ready signal from one of said peripheral circuits;

a NOR circuit, connected to said timer circuit and said AND circuit, for passing an output signal of said AND circuit when an output signal of said timer circuit is low; and a second NAND circuit, connected to said first NAND circuit and said NOR circuit, for passing an output signal of said NOR circuit when the output signal of said first NAND circuit is high.

3. An apparatus as set forth in claim 2, wherein said timer circuit comprises:

a monostable multivibrator, connected to said first NAND circuit, for generating a pulse signal when the output signal of said first NAND circuit is changed from high to low; and a counter circuit, connected to said monostable multivibrator, for counting a clock signal to generate a carry signal when a value of said counter circuit reaches a definite value, said counter circuit being reset by said pulse signal of said monostable multivibrator.

* * * * *